UNITED STATES PATENT OFFICE.

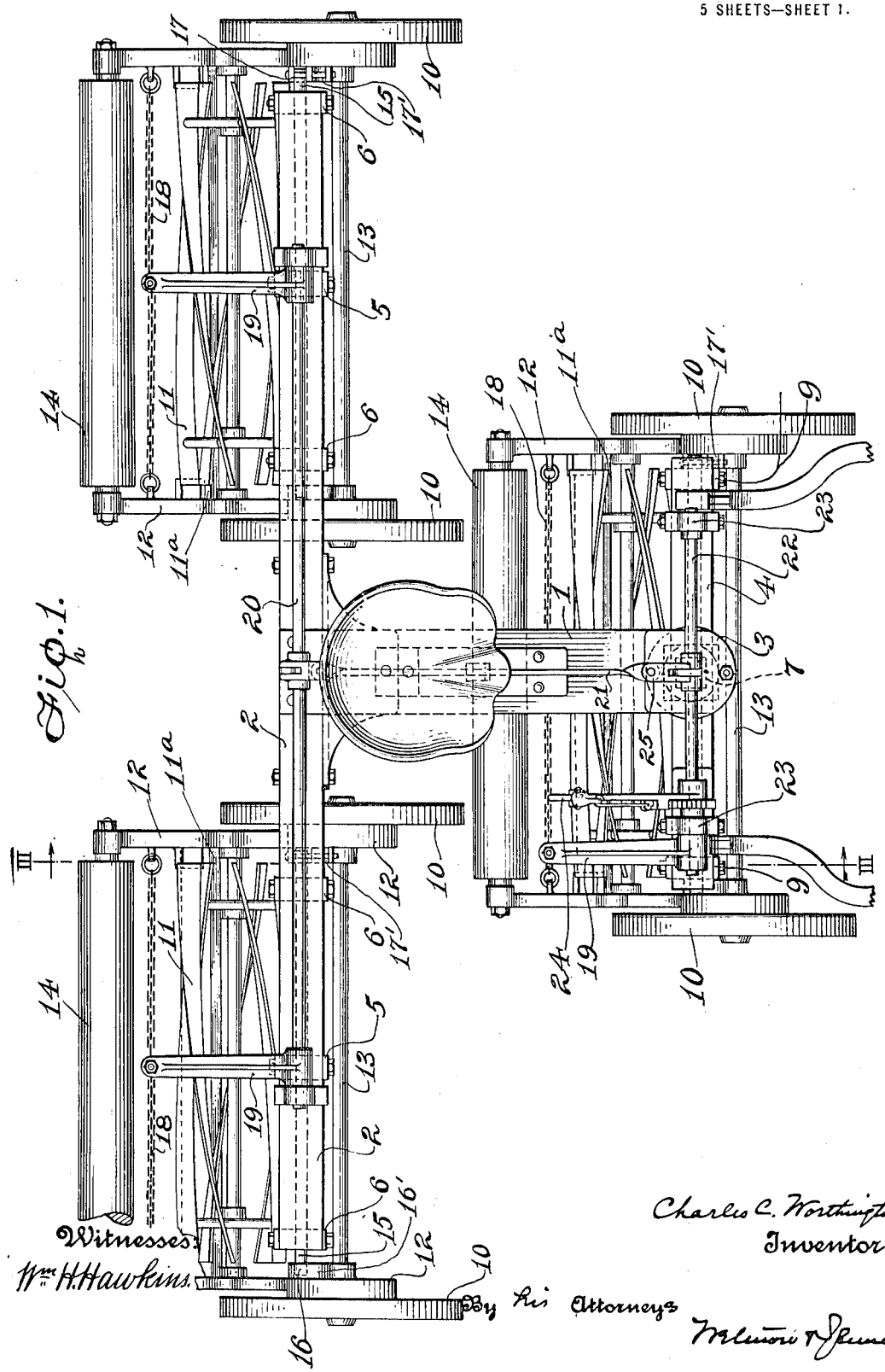

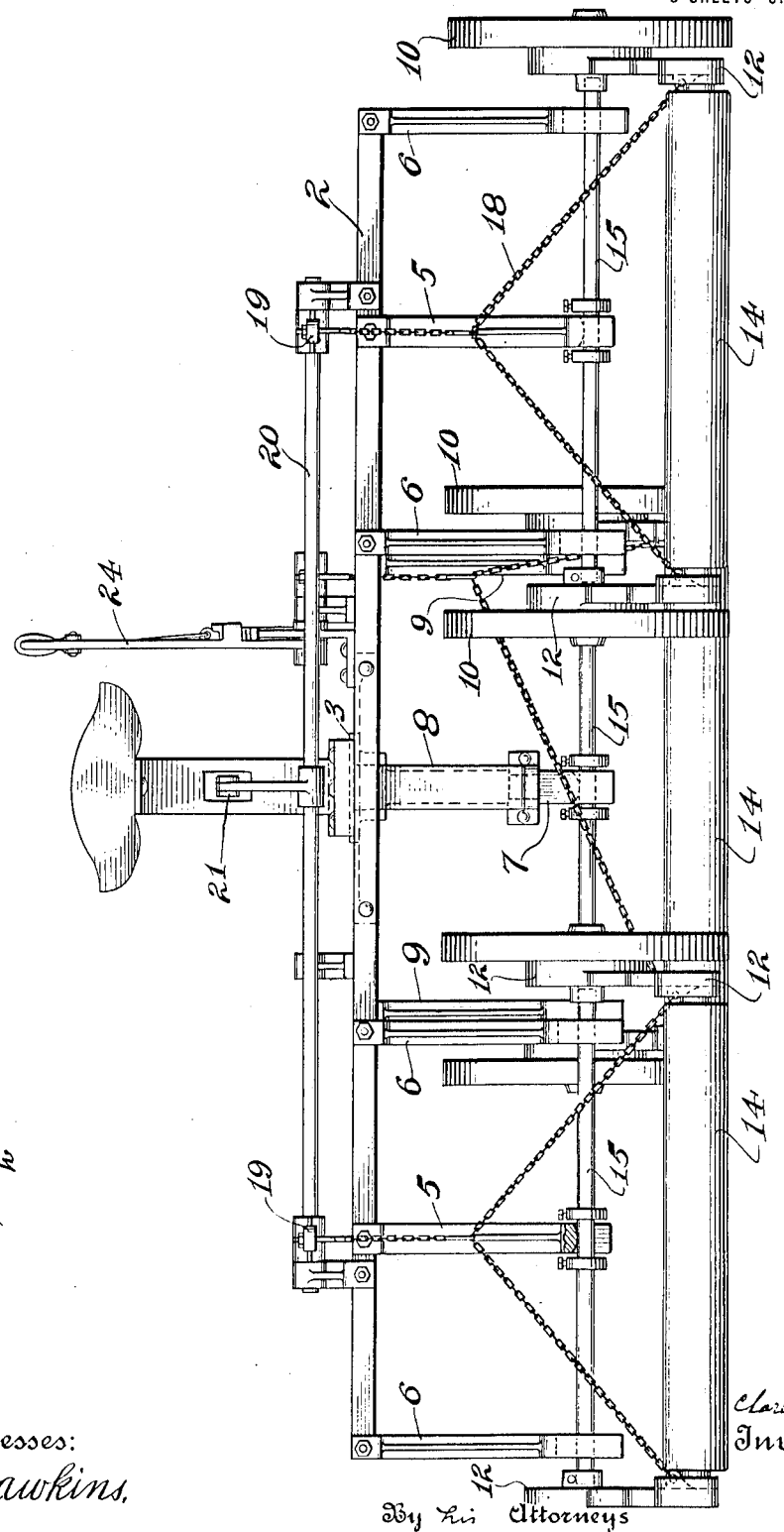

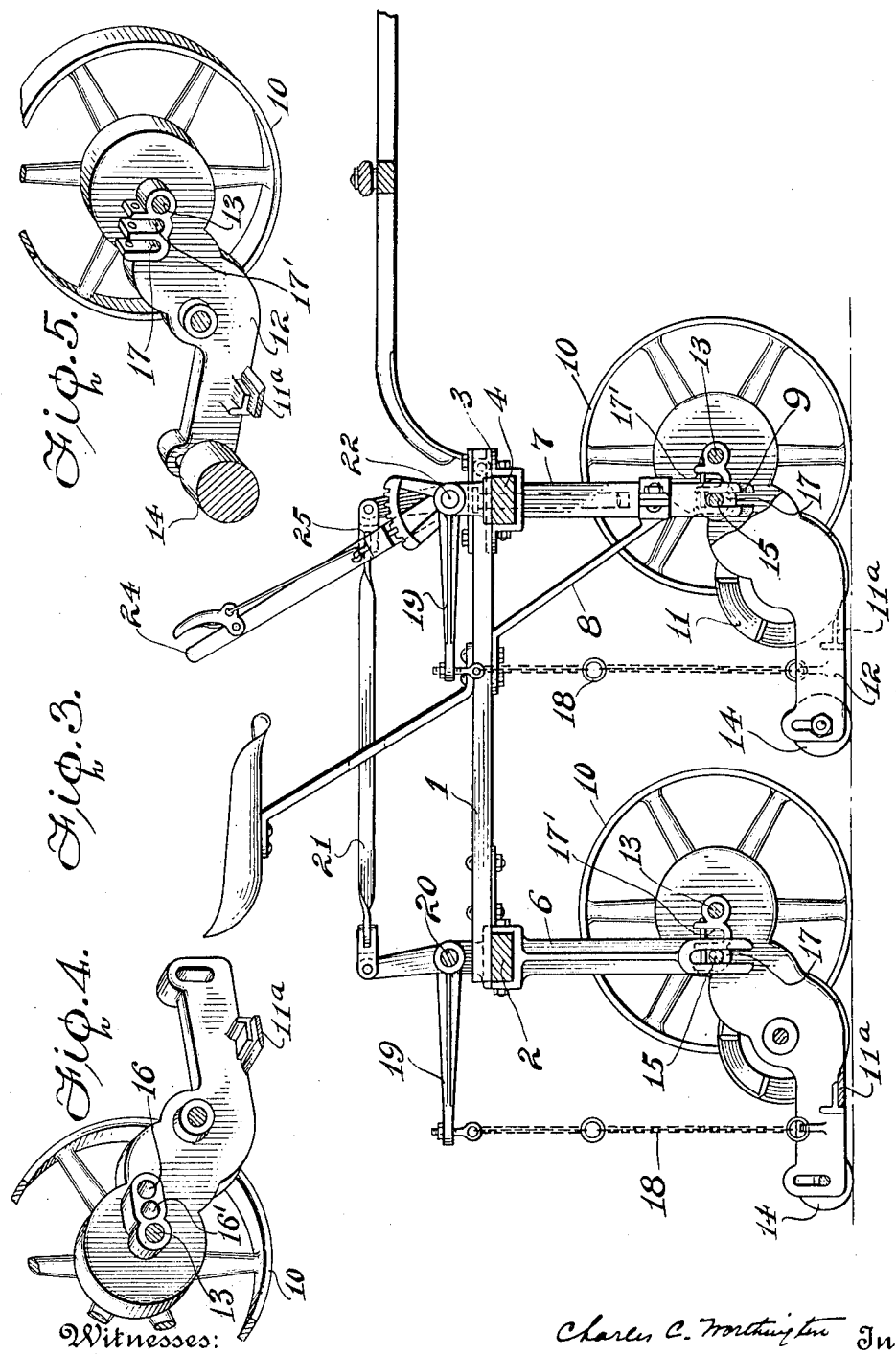

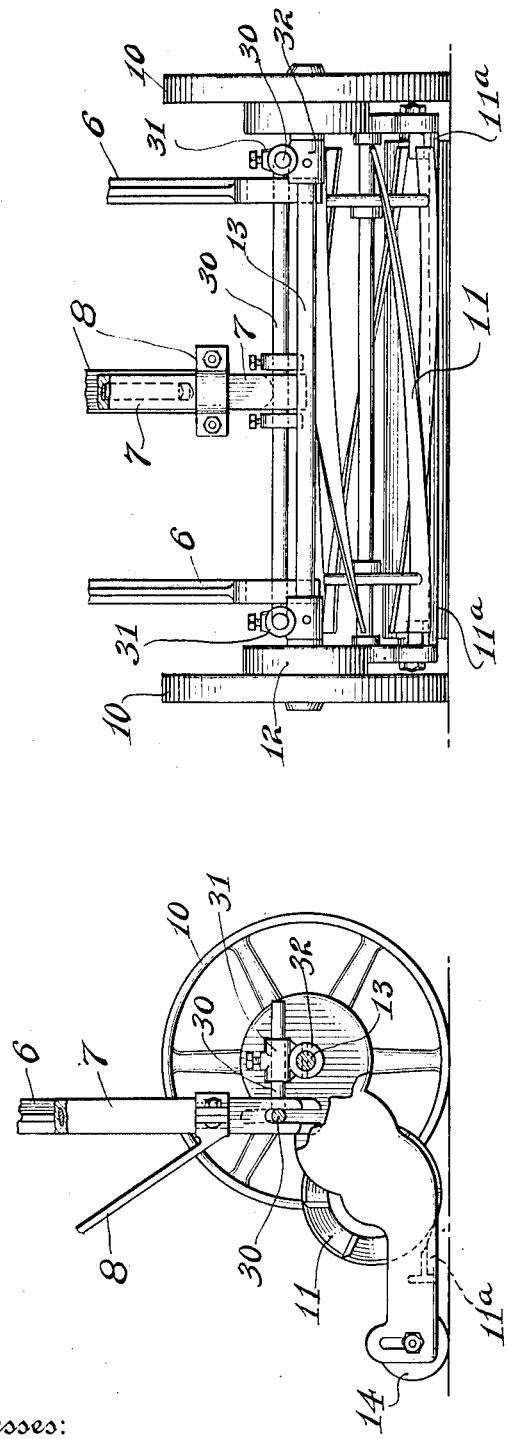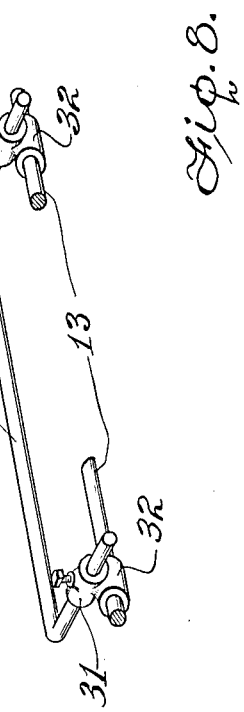

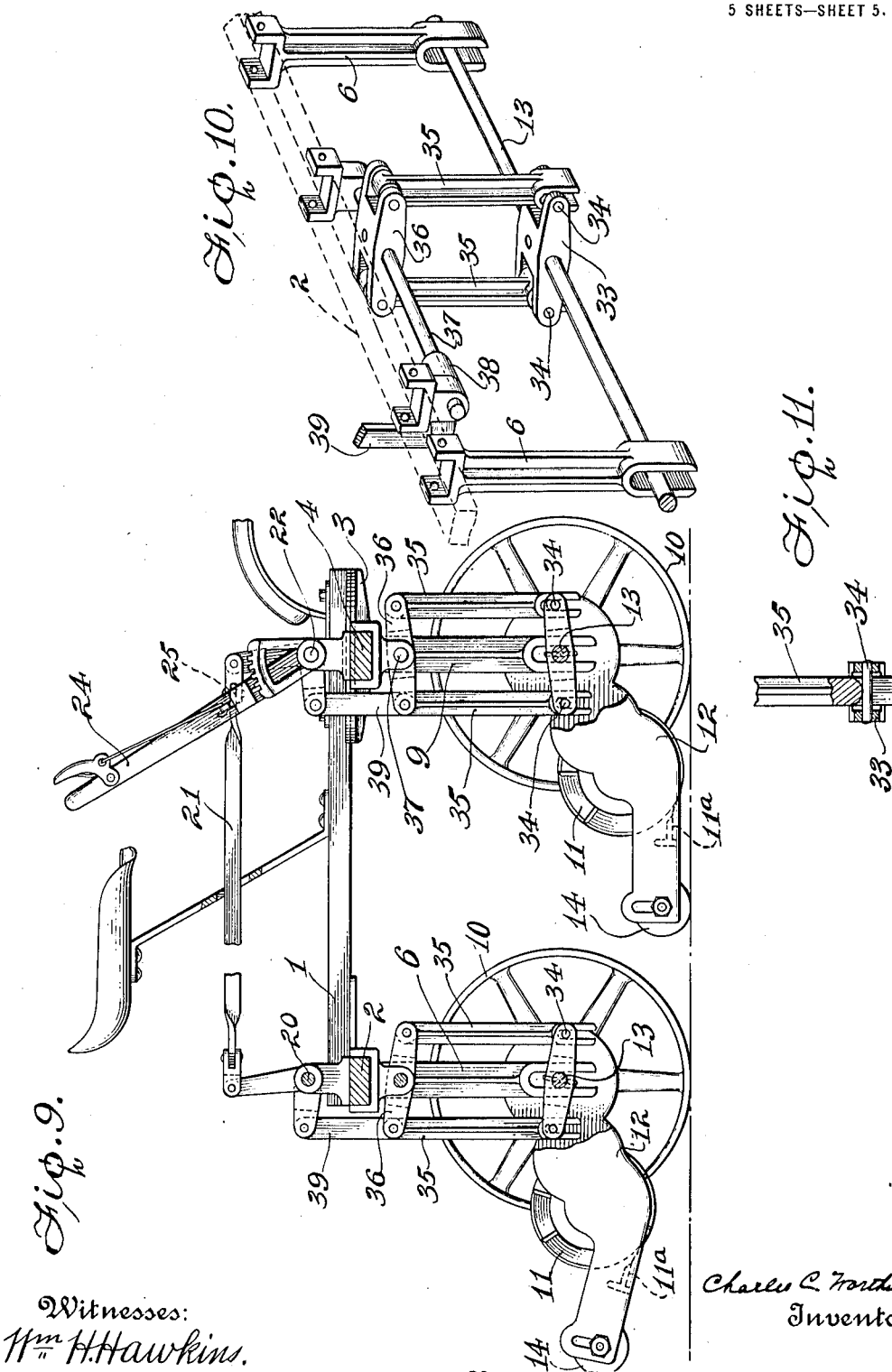

CHARLES C. WORTHINGTON, OF DUNNFIELD, NEW JERSEY, ASSIGNOR TO SHAWNEE MOWER COMPANY, OF NEW YORK, N. Y., A CORPORATION OF PENNSYLVANIA.

LAWN-MOWER.

1,313,972.  Specification of Letters Patent.  Patented Aug. 26, 1919.

Application filed December 21, 1915. Serial No. 67,960.

*To all whom it may concern:*

Be it known that I, CHARLES C. WORTHINGTON, a citizen of the United States, residing at Dunnfield, Warren county, New Jersey, have invented the following described Improvements in Lawn-Mowers.

The invention concerns the organization of the mower units in gang lawn mowers in such manner as to utilize the weight of the uniting framework to control the relation of the several cutters to the ground and hold them properly to their work while permitting them to follow and conform to the irregularities or undulations in the lawn surface. The principles of the invention are illustrated in the accompanying drawings, wherein—

Figure 1 is a top plan of a gang lawn mower embodying the invention;

Fig. 2 a rear elevation with the cutter mechanism removed, for clearness;

Fig. 3 a side elevation with the parts in section on line III—III;

Figs. 4 and 5 perspective details of the cross-rod brackets;

Fig. 6 a side elevation, partly in section, of one of the mower units of a modified form;

Fig. 7 a front view of Fig. 6;

Fig. 8 a detail of the cross-rod of Figs. 6 and 7;

Fig. 9 a side elevation, with parts in section, of a further modification;

Fig. 10 a perspective of the weight shifting and pertinent parts of Fig. 9; and

Fig. 11 a detail of the bearing post of Figs. 9 and 10.

The gang lawn mower shown in Figs. 1 to 5, is composed of three lawn-mower units of a familiar type, which are arranged one in front and two in rear, or otherwise, so that their respective swaths will meet or slightly overlap. To such arrangement they are confined by a main frame, which is carried by them and pivotally connected to them in such manner that each may tilt in a vertical plane and thereby accommodate the varying slopes of lawn which are encountered as the machine is advanced. The main frame comprises a central longitudinal reach piece 1, bolted and braced at its rear end to a cross-piece 2, extending over the two rear units, and connected at its forward end, by means of a suitable fifth-wheel joint 3, to a front cross-piece 4. The rear cross-piece 2 is equipped with two downwardly extending bearing-posts 5, one over the central part of each of the rear mower units, by which the rear part of the frame is supported upon said units, and also with two pairs of guide-posts 6, one pair for each rear unit. The bearing posts 5 are forked at their lower ends to straddle the cross-rods 15 of their mower units, forming the pivotal or rocker connections therewith, as shown at the left of Fig. 2. A pair of collars on each side of the bearing post fork retains it in a central position on the rod. The guide-posts 6 are disposed one on each side of the bearing posts 5, near the ground wheels, and are also forked at their lower ends to embrace the same cross-rod. Their purpose is to keep their respective mower units true with the frame and relieve or prevent the twisting strains that might otherwise fall on the central rocker joints, but without interfering with the vertical tilting of the units, for which reason their forks are long enough to accommodate the maximum angle the units are likely to assume. These guide-posts obviously might accomplish the purpose just stated by engagement with any other part of the unit, or they might be omitted entirely by making the rocker-joint itself sufficiently strong to hold the unit straight with the frame. The forward cross-piece 4 is similarly equipped with a single, central, bearing post 7, by which the front part of the frame is supported on the front mower. This post has a similar rocker joint between central collars on the front cross-rod, as in the case of the rear units, and is also internally recessed to accommodate the king-pin of the fifth-wheel, as indicated in dotted lines in Fig. 3, and is also fitted to a brace-bar 8, extended obliquely from the under side of the reach piece 1 and engaged with the post in some manner that will not interfere with the turning of the front cross-piece on the fifth-wheel joint. The front cross-piece is also equipped with guide posts 9 at its ends, similar to the posts 6 and for the same purpose.

The drawings illustrate a metal and wood construction of the frame work just described, but there is no necessary limitation thereto, nor to the design or manner of assemblage of the several parts provided only that the frame shall unite and hold the several units in their prescribed arrangement and shall be supported in part at least by them. It is preferred that the frame shall rest on points midway between the vertical planes of the ground wheels of the respective units and that such points shall be so disposed as to transmit substantially equal and substantially non-varying portions of the weight of the frame and of the operator seated thereon, to each unit, as shown in the drawings and in accordance with the principles set forth in my prior application Serial No. 803,296. A pair of shafts is indicated as attached to the front cross-piece, adapting the machine to be horse-drawn, although it may be otherwise propelled.

The type of mower unit employed and preferred comprises a pair of ground wheels 10 geared to drive at high speed, a rotary cutter reel 11, which coöperates with a dead knife 11ª in the usual manner. The driving gears are concealed in the side plates or housings 12 and the latter are joined rigidly together by means of the bed structure of the dead knife and by a cross-rod 13, thus forming the frame of the unit. The said cross-rod 13, being generally coincident with the axis of the ground wheels, is sometimes termed the axle. The usual wiper roll 14 is journaled in this frame immediately in rear of the cutter reel and together with the ground wheels constitutes the means whereby the unit commonly rests on the ground when engaged in cutting. The ground wheels 10 constitute the front point of support on the ground and the wiper roller 14 the rear point.

According to this invention, the weight of the main framework serves to press the cutter mechanism of the mower units upon the ground and in such manner as to hold it reliably to its work, without obstructing either the tilting of the units on their rocker joints or the rise and fall of the cutter mechanism as it follows the contour of the ground. In the familiar type of mower shown in the drawings, the thrust of the driving gear trains (concealed in the side housings 12) tends to lift the cutter reel and frequently causes it to jump up and skip patches of grass intended to be cut, a tendency which is naturally aggravated by heavy grass or a rapid rate of advance. The weight of the unit itself cannot practically be increased to overcome this objection because of the corresponding increase of the total load to be moved and for other reasons. But by so disposing the superposed framework as to impart pressure to the cutter mechanism, additional gravitational effect and a proper pressure on the ground can be obtained in a simple manner and without addition to the total load. To this end the cross-rods 15 above mentioned, are mounted in, or formed as part of, the frames of the units between their front and rear ground supports, and are to be understood as representing generically a suitable form of bearing seat for the main framework upon the mower units and adapted to press the cutter mechanism toward the ground. In the specific structure shown in Figs. 1 to 5 the said rods 15 are removably set in socketed brackets cast on the side housings 12, one being seated in a hole 16 in one housing bracket, and the other in an open socket 17 in the opposite bracket in which it is pinned for security. The same brackets may also contain other, additional, sockets such as 16' and 17', at different distances from the axis of the ground wheels, and adapted to receive the cross-rod when it is desired to increase or decrease the downward pressure on the cutter mechanism, which pressure will, of course, be proportional to the distance of the rod from the ground wheel axis.

With such disposal of the weight of the main frame, the rear ends of the mower units can be swung upwardly, turning on the axes of the ground wheels, so as to raise the cutters above their normal cutting position or entirely out of cutting relation, whenever that may be necessary. Such lifting of the cutters will naturally be accompanied by a corresponding slight elevation of the main frame, but can readily be accomplished by means of any suitable power-multiplying control device, such as the latch lever 24 mounted on the main frame. For this purpose, each unit frame is connected at its rear end, by a bridle and chain 18, to a crank arm 19, carried on the main frame directly above it. The crank arms for the two rear units are mounted on a rock shaft 20 journaled in bracket bearings on the cross-piece 2 and connected by cranks and a link 21 to the front rock-shaft 22, on which the crank arm 19 for the forward unit is mounted. This rock shaft 22 is journaled in bracket bearings 23 on the front cross-piece 4, and the latch lever 24 is conveniently applied to one end of this shaft where it will be at the side of the operator. By this lever both rock shafts 20 and 22 can be simultaneously rocked to raise their respective crank arms and through the latter, lift the cutter mechanism of the several units from the ground, and the units may be held at the desired elevation by locking the lever to its segment rack, in the obvious manner. Inasmuch as the fifth wheel joint intervenes between the front and rear rock shafts, the connecting link 21 is provided with a joint 25 having a vertical axis, and which assumes a position substantially coincident with the axle of the fifth-wheel whenever the latch lever 24 has been pushed forwardly and placed the lifting connections under strain, thus permitting the free play of the fifth-wheel without interfering with the functions of the said connections. At other times when the said connections are not under strain, the effects of the disalinement of the said joint 25 from the fifth wheel are of no practical consequence and are adequately taken care of by the flexibility of the link, disposed with its flat side vertical for the purpose, and also by the natural looseness of the joints.

While I have illustrated a single controlling device as simultaneously operating all of the mower units, it will be perfectly evident that individual levers or devices can be supplied for each unit, if so desired, and so that any one of them can be raised from the ground without raising the others, and it will also be evident that the latch lever 24, representing a means whereby the operator may easily lift the cutter mechanism, can also assume variant forms following principles well known in the mechanic arts.

In the form of construction shown in Figs. 6 to 8, it will be understood that the superposed framework and the structure of the mower units may be the same as already described. The cross-rod 30 which supports the weight of the framework in this form, is slidingly adjustable on the unit frame, and can be set to any desired distance from the axis of the ground wheels and thereby regulate with closer accuracy than in the preceding form, the proportion of pressure imparted to the cutter mechanism. While it is intended and preferred that the several units each support an equal portion of the total superposed load as in the arrangement already described, it is nevertheless possible that the invention may be used where the load of the main frame is unequally apportioned on the various units and in such cases the nice adjustment of the rod 30 permits the downward pressure on all the wiper rolls to be brought to substantial equality. The ends of the rod 30 are turned forwardly and held by set screws in the cross-sockets 31 which are carried on sleeves 32 pinned firmly to the fixed axle rod 13 of the unit, or otherwise suitably connected to the frame of the unit. The guide-posts 6 or 9 may engage the same cross-rod 30, or any other convenient part, to preserve alinement, as before.

Referring now to Figs. 9 to 11, the structure there illustrated involves a development of the principles above described, according to which the point of bearing of the framework on the mower units may be shifted by the operator from a point on one side of the axis of the ground wheels to a point on the other side, thereby giving a positive control of the position of the cutter mechanism with relation to the ground. In these figures the frame parts 1, 2, 3 and 4, may be assumed to be the same as already described but the forked guide posts 6 and 9 in this case engage and guide the axles 13 of the units, near its ends. At the middle of the axle 13 there is fixed a double-arm rocker lever 33, provided with bearing pins 34 on opposite sides of the axle and the weight of the superposed frame is transmitted to one or the other, or both, of these bearing pins, by means of two strut members 35 which engage said pins by their lower forked extremities. The upper ends of the struts are pivotally connected to the opposite ends, respectively, of a similar rocker lever 36, carried fast on a rock shaft 37, appropriately journaled to the under side of the frame. This rock shaft has operating connection with the control device 24 through its crank arm 38, which is connected by link 39 to the rock shaft 20 for the rear mowers, or the rock shaft 22 for the front mower unit, as the case may be, and so that the movement of the hand lever 24 in a rearward direction will depress the rear ends of the rocker levers 36 and 33 and thereby cause the weight of the framework and operator to be exerted more or less upon the rear bearing pins 34. As these rear pins are in rear of the axis of the ground wheels, the cutter mechanism becomes urged toward the ground accordingly. A sufficient movement of the lever in the opposite direction will obviously shift the transmission of the weight to the forward bearing pin 34, which being resisted solely by the gravity of the mower frames, will cause the latter to rise to any extent that may be desired, and by means of the latch on the hand lever, they may be held elevated. The strut members 35, one or both, constitute the rocker joint on which the mower unit may tilt in its vertical plane to accommodate irregular lawn surfaces. They are therefore forked like the bearing posts 5 and 7 and are also similarly rounded, as shown in Fig. 11, so as to rock readily on the bearing pins in the same manner as the posts 5 and 7 rock on the rods 15, but the particular character of this joint or bearing may be adapted to circumstances and preference as will be evident.

It will be observed that the primary function of the wiper rollers 14 is to determine the normal elevation of the dead knife from the ground, for which purpose it is adjustable in the frame of the unit, yet the said rollers may perform no function whatever when the frames of the units have been lifted and are still employed for cutting grass, as is frequently desired to be done. In such cases the lifting agencies constitute in effect the rear ground supports for the mower units, and in the case of Figs. 9 and 10 the strut members 35 may serve the same purpose since they constitute the means for producing the elevation of the cutter (as shown at the left of Fig. 9), as well as the means for imparting the weight of the superposed framework to the units for causing them to keep to the ground as they advance over irregularities and thick grass, which functions they may perform regardless of support from the wiper rolls.

It will thus be apparent that the forms of the invention shown in the drawings are merely illustrations of the principles of the invention, which have now been fully explained, and that in consequence various modifications, alterations and changes in the size, shape and relation of the parts may be resorted to without departing from the invention or defeating the benefits derivable therefrom.

I claim:

1. A lawn mower comprising a uniting framework supported upon a gang of mower units and connected thereto whereby each unit is free to oscillate independently of the other units in accommodation to ground undulations, said units having rotary cutters and coöperating dead-knives pressed toward the ground by the weight of said framework.

2. A lawn mower comprising a gang of mower units, each having a rotary cutter mechanism, a frame-work uniting and holding the units in a predetermined arrangement and organized therewith to permit independent oscillations of the several units in accommodation to ground undulations, the connection between the frame and one or more of the units being arranged on the latter to press the cutter mechanism thereof toward the ground.

3. A lawn mower comprising a framework uniting a gang of mower units, the cutter mechanism of one or more of said units being carried in a frame and held to the ground by the weight of said uniting framework upon said frame, and means on said framework for elevating the cutter mechanism of said unit.

4. A lawn mower comprising a framework supported on a gang of mower units each being free to accommodate ground undulations independently of the others and having front and rear points of bearing upon the ground, said framework imparting its weight to the frames of said units between the said points of bearing.

5. A lawn mower comprising a superposed framework with a seat for the operator and a gang of mower units each comprising a frame containing a rotary cutter mechanism therein and supported on the ground at front and rear points, whereby said cutter mechanism is maintained at a predetermined distance from the ground, the entire weight of the superposed framework resting on the mower frames at points between the front and rear supports thereof.

6. A lawn mower comprising a gang of wheeled mower units, each comprising a frame containing a rotary cutter reel and dead knife, a uniting framework for said units connected thereto by means permitting their accommodation to undulating ground surface, the connections having a bearing on said frames and adapted to press the cutter mechanisms thereof toward said ground surface.

7. A lawn mower comprising a gang of wheeled mower units, each comprising a frame containing a rotary cutter reel and dead knife, a uniting framework for said units including a fifth-wheel joint, pivotal connecting means between said framework and said frames permitting the mower units to accommodate undulating ground surface, said pivotal connection being disposed between the front and rear supports of said frames to press the cutter mechanism thereof toward the ground surface.

8. A gang of mower units, each including a frame containing a rotary cutter reel and dead knife, a uniting framework for said units mounted thereon with its weight distributed in substantially equal and substantially non-varying amounts upon each of said units and disposed on said frames between the front and rear ends thereof to resist upward movement of the cutter mechanism of said units.

9. A gang of mower units, each including a frame containing traction wheels, a rotary cutter operated thereby and in rear thereof and a dead knife, in combination with a uniting framework for said units mounted thereon with its weight distributed in substantially equal and substantially non-varying amounts upon each of said traction wheels, and imparted to the frames of said units at points in rear of the axes of said traction wheels.

10. A gang of mower units, each including a frame containing a rotary cutter reel and dead knife, and a uniting framework for said units mounted thereon with its weight distributed in substantially equal and substantially non-varying amounts upon each of said units and having a bearing point between the front and rear supports of one or more of said frames to resist upward movement of the cutter mechanism of said units, in combination with means for elevating said cutter mechanism from the ground.

11. In a lawn mower, a mower unit having traction wheels and a frame containing cutter mechanism mounted for vertical oscillation about the axes of said wheels, in combination with a superposed frame work having a point of bearing on said frame and means for shifting the point of bearing.

12. In a lawn mower, a mower unit having traction wheels and a frame provided with cutter mechanism mounted for vertical oscillation about the axes of said traction wheels, in combination with a superposed framework having a point of bearing on said frame and means for shifting said point of bearing to opposite sides of the axes of the traction wheels.

13. In a gang lawn mower a group of lawn mower units maintained in a predetermined relative arrangement and comprising ground wheels and rotary cutters driven thereby and adapted to oscillate vertically about the axis of said ground wheels, in combination with gravitational means structurally independent of said units and applied to them in rear of said wheel axes and adapted to press said cutters toward the ground.

In testimony whereof, I have signed this specification in the presence of two witnesses.

CHARLES C. WORTHINGTON.

Witnesses:
JOHN T. CROWLEY,
K. L. GRANT.